United States Patent [19]

James, Jr. et al.

[11] 4,193,430

[45] Mar. 18, 1980

[54] METHOD AND APPARATUS FOR FILLING CONTAINERS WITH A RELATIVELY VISCOUS MATERIAL

[75] Inventors: Forrest H. James, Jr.; Ira J. Silberman, both of Opelika, Ala.

[73] Assignee: Diversified Products Corporation, Opelika, Ala.

[21] Appl. No.: 843,267

[22] Filed: Oct. 18, 1977

[51] Int. Cl.[2] ........................ B65B 3/04; B65B 43/54; B65G 3/12

[52] U.S. Cl. ........................................ 141/12; 141/72; 141/78; 141/85; 141/172; 141/178; 222/199; 366/196

[58] Field of Search ........................ 222/199, 233, 410; 141/1-12, 250-284, 71-80, 85, 89, 168, 172, 178, 237, 242, 392; 53/525; 198/345, 631; 366/195, 196, 212, 313

[56] References Cited

U.S. PATENT DOCUMENTS

| | | | |
|---|---|---|---|
| 751,187 | 2/1904 | Lewiak | 366/195 X |
| 1,300,441 | 4/1919 | Marsa | 222/199 |
| 2,187,717 | 1/1940 | Weyandt | 222/199 |
| 2,795,990 | 6/1957 | Bohlman et al. | 141/12 X |
| 2,798,643 | 7/1957 | Arnett et al. | 366/196 X |
| 3,270,390 | 9/1966 | James, Jr. et al. | 141/12 X |
| 3,491,505 | 1/1970 | Hasselmann | 141/172 X |
| 3,563,420 | 2/1971 | Ansley | 222/199 |
| 3,921,685 | 11/1975 | Steffes | 141/392 X |

FOREIGN PATENT DOCUMENTS

| | | | |
|---|---|---|---|
| 517612 | 3/1955 | Italy | 222/199 |

*Primary Examiner*—Frederick R. Schmidt
*Attorney, Agent, or Firm*—Schuyler, Birch, McKie & Beckett

[57] ABSTRACT

A system for filling generally cylindrical barbell weight shells with a relatively viscous slurry of cementitious material comprises a roller conveyor which transports a plurality of carriers each supporting a plurality of barbell weight shells thereon through a plurality of stations. At a lubricating station, the exterior of the shells is coated with a light film of oil to facilitate subsequent cleaning thereof. At a filling station, a dispensing hopper having a plurality of downwardly projecting nozzles dispenses the cementitious slurry into the shells. Each of the carriers is positioned beneath the hopper, the shells thereon are aligned with the nozzles, and a lift table lifts the shells off of the roller conveyor into engagement with the nozzles. Vibratory and agitator devices induce the flow of the slurry from the hopper into the shells under the influence of gravity. At a curing station, comprising a dip tank and an elongated roller conveyor section, the cementitious material inside the shells is substantially fully cured. Finally, hydraulically actuated discharge pushers transfer the filled shells from the carriers onto a discharge conveyor.

15 Claims, 17 Drawing Figures

METHOD AND APPARATUS FOR FILLING CONTAINERS WITH A RELATIVELY VISCOUS MATERIAL

BACKGROUND OF THE INVENTION

1. Field of the Invention

The present invention relates generally to a method and apparatus for filling containers with a relatively viscous material and, more particularly, to such a method and apparatus for filling generally cylindrical, plastic barbell weight shells with a relatively viscous slurry of a cementitious material.

2. Description of the Prior Art

The use of barbells, which comprise an elongated bar and one or more generally cylindrically shaped weights mounted on each end of the bar, has long been known for exercising and physical fitness purposes. In recent years, a large number of barbell weights generally have been made from hollow plastic shells filled with a solidified cementitious material, as shown in U.S. Pat. No. 3,171,652 to Newman. Various problems are encountered in the manufacture of such barbell weights, principally because of the difficulty of filling the shells uniformly with a slurry of such a material due to the very viscous nature of the slurry.

One prior art apparatus and associated method for filling plastic barbell weight shells are disclosed in U.S. Pat. Nos. 3,270,390 and 3,360,019 to James. These patents teach that a plurality of barbell weight shells are supported on an elongated rod beneath a dispensing hopper having a plurality of downwardly projecting nozzles. Each of the nozzles fits into an opening in one of the shells for dispensing a relatively viscous slurry of a cementitious material from the hopper into the shell. Vibrators are associated with the shell support rod and the dispensing hopper for assisting the flow of material from the hopper into the shells. Although such a system has been successful for filling barbell weight shells, it is not as efficient as might be desired. Only a given number of shells can be filled at one time after which the filled shells must all be manually removed from the shell support bar and a group of empty shells manually inserted thereon. The necessity for such a large number of manual operations results in a relatively slow shell filling rate at a relatively high labor cost.

Various other prior art patents disclose various types of systems for automatically or semiautomatically dispensing various types of material into containers. For example, U.S. Pat. No. 3,149,188 to Schmitt discloses an apparatus for dispensing soap into cylindrical shells, U.S. Pat. No. 1,094,380 to Tait discloses a device for automatically filling milk bottles, and U.S. Pat. No. 766,329 to Cunning discloses a process for automatically filling cans. However, none of the processes and devices disclosed in these prior art patents is well adapted for efficiently filling containers with a relatively viscous material.

SUMMARY OF THE INVENTION

Accordingly, it is an object of the present invention to provide an improved method and apparatus for filling containers with a relatively viscous material, and particularly for filling barbell weight shells with a relatively viscous slurry of a cementitious material in an efficient and labor-saving manner.

It is an additional object of the present invention to provide an improved dispensing means for filling containers with a relatively viscous material, and a novel conveying means for supporting and transporting a plurality of such containers.

These and other objects of the present invention are obtained by a system comprising means for conveying a plurality of containers, each having a filling opening therein, through a plurality of stations; the conveying means including a plurality of carriers each of which supports at least one container thereon with its filling opening oriented upwardly. A lubricating station comprises means for lubricating the exterior of the containers prior to the containers receiving a viscous material therein to facilitate the removal of any spillage of the material. A filling station comprises a dispensing hopper for filling the containers with the viscous material. A capping and cleaning station includes means for closing the openings in the containers and cleaning the container exteriors. A curing station includes means for substantially fully curing the viscous material inside the containers while the containers are still supported on the carriers. Finally, a discharge station is provided having means for discharging the filled containers from the carriers onto a discharge conveyor.

BRIEF DESCRIPTION OF THE DRAWINGS

The novel features of the invention are set out with particularity in the appended claims, but the invention will be understood more fully and clearly from the following detailed description of a preferred embodiment thereof given in connection with the accompanying drawings in which:

DETAILED DESCRIPTION OF A PREFERRED EMBODIMENT

Figure 1:
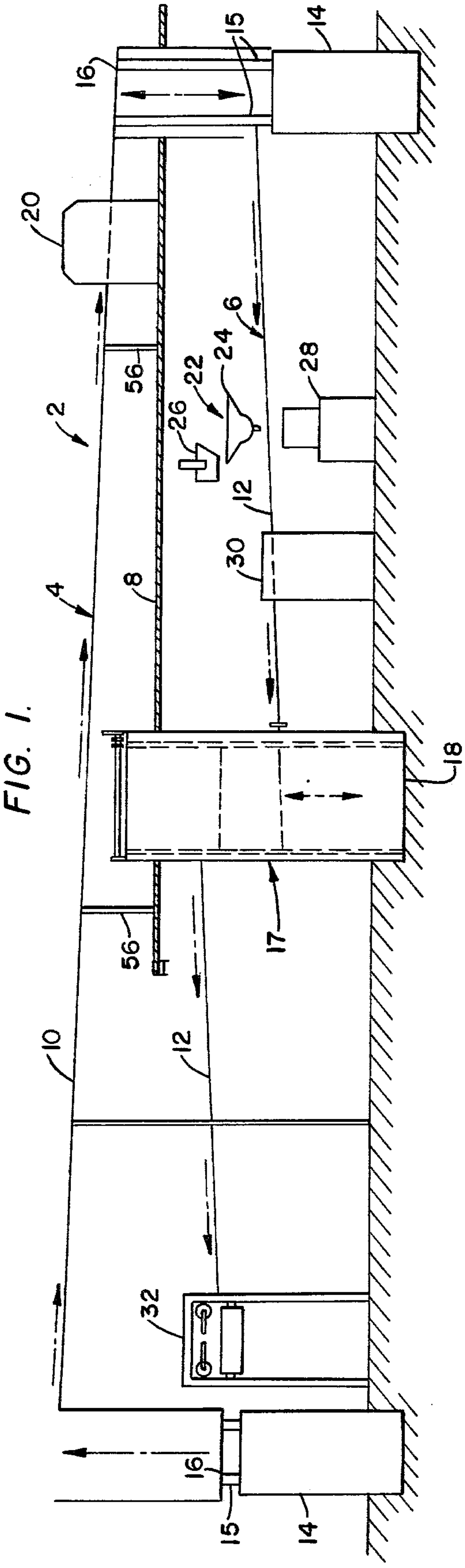
FIG. 1 is a diagrammatic view of the overall system for filling a plurality of barbell weight shells with a relatively viscous slurry of a cementitious material according to the present invention.

Referring first to FIG. 1, the overall system according to the present invention as adapted for filling barbell weight shells with a relatively viscous slurry of a cementitious material is indicated generally at 2. To conserve space, system 2 comprises an upper section 4 and a lower section 6 positioned respectively above and below a floor 8 in a suitable building (not shown). However, system 2 could be disposed all on one level if so desired.

Filling system 2 comprises an upper conveyor section 10 and a lower conveyor section 12. Conventional hydraulic elevators 14, each having a generally horizontal platform 16 connected to pistons 15, are provided at each end of upper and lower conveyor sections 10 and 12 for providing communication therebetween as will be described hereafter. Upper conveyor section 10 slopes downwardly from one end to the other in a continuous manner, as is apparent from FIG. 1. However, lower conveyor section 12, although sloping downwardly from one end to the other in a manner similar to upper section 10, is split intermediate its ends into two subsections, the adjacent ends of which are vertically and horizontally offset to accommodate a dip tank 18 therebetween.

A lubricating station 20 is positioned around a portion of upper conveyor section 10. In addition, a filling station 22 having a dispensing hopper 24, a filling bucket 26 and a lift table 28 is positioned adjacent a portion of lower conveyor section 12. Immediately following filling station 22 along section 12 is a capping and cleaning station 30 which is followed by a curing station 17 that includes dip tank 18. A discharge station 32 is positioned adjacent the end of section 12.

Carrier and Conveying Means

Figure 2:
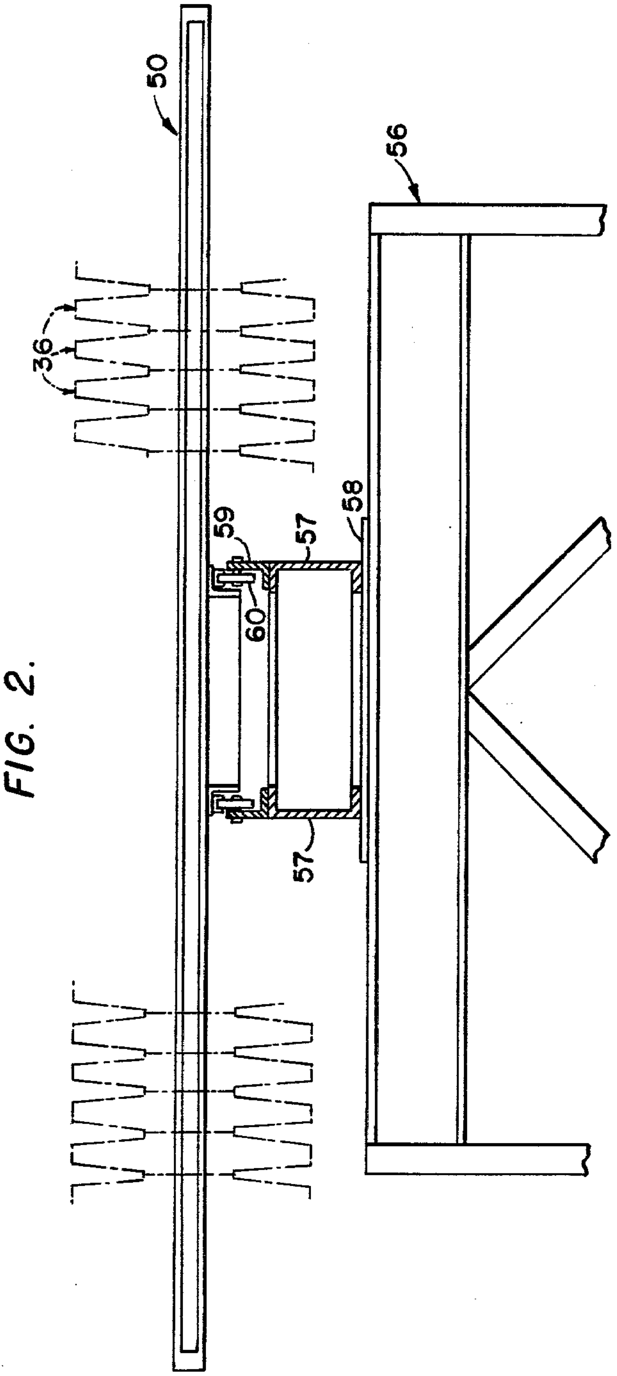
FIG. 2 is a front elevational view of the conveying means for the barbell weight shells.
Figure 3:
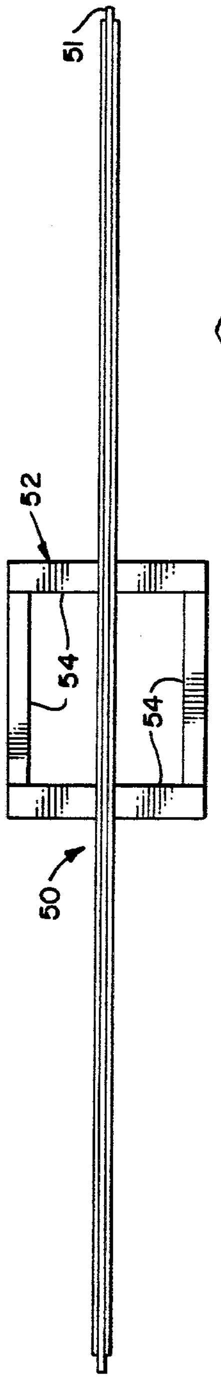
FIG. 3 is a plan view of the carrier which supports the barbell weight shells.
Figure 4:
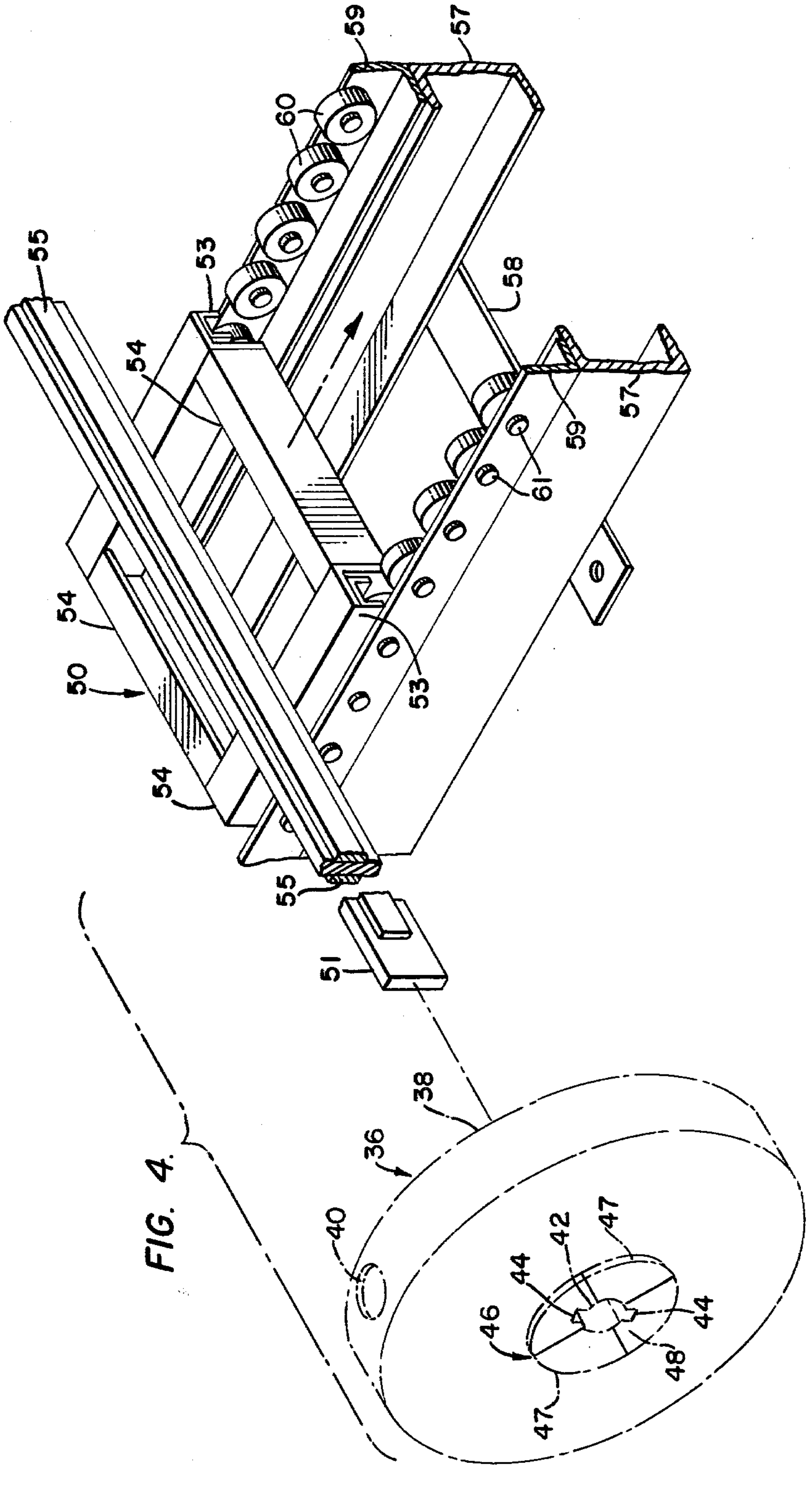
FIG. 4 is a perspective view of the barbell weight shells and the conveying means.

Referring to FIGS. 2–4, the means for conveying a plurality of barbell weight shells through the above-mentioned stations will be described. As shown in FIGS. 2 and 4, a typical barbell weight shell 36 comprises a generally cylindrical, hollow, plastic casing 38 having a circular filling opening 40 in the periphery thereof and a circular bore 42 at the axis of casing 38. Bore 42 is of sufficient diameter to mate with a conventional barbell bar, and has slots 44 projecting from diametrically opposite sides thereof such that shell 36 can be mounted on a carrier 50, to be described hereafter, with opening 40 in a vertically upright position. In addition, shell 36 is provided on each side with a locking means 46, preferably of the type disclosed in U.S. Pat. No. 3,463,486 to James, having a plurality of alternately, circumferentially disposed raised lands 47 and recesses 48. Locking means 46 conventionally serves to lock together adjacent shells 36 when they are subsequently mounted on a barbell bar.

Referring to FIGS. 3 and 4, a typical carrier 50 for supporting thereon a plurality of barbell weight shells 36 is shown, comprising a transversely and horizontally extending, elongated bar 51 and an undercarriage 52 to which bar 51 is affixed. Undercarriage 52 comprises four L-shaped members 54 suitably connected together at their ends to form a rectangular frame. Bar 51 is affixed to the upper surfaces of the top flanges of two oppositely disposed members 54, with bar 51 longitudinally and transversely centered on carrier 52. Downwardly facing U-shaped channels 53 are affixed to the under surfaces of the same flanges. Bar 51 is suitably dimensioned in transverse cross-section to be engaged by slots 44 in shells 36. When a plurality of shells 36 are placed onto bar 51, the shells are supported on carrier 50 and prevented from rotating so that openings 40 are oriented vertically upwardly due to the rectangular traverse cross-sectional shape of bar 51 and cooperating slots 44. Auxiliary strips 55 may be secured to the front and rear of bar 51 to provide for a snugger fit of the bar within bore 42. However, strips 55 are not necessary and may be omitted if desired.

Referring to FIGS. 2 and 4, upper and lower conveyor sections 10 and 12 both comprise roller conveyors having a plurality of longitudinally spaced support frames 56 which support two transversely spaced U-shaped beams 57 having brackets 58 extending therebetween for attachment to each support frame 56. The upper surface of each beam 57 supports an L-shaped member 59, each of which supports thereon a plurality of conveyor rollers 60 rotatably mounted on stub shafts 61. The spacing between members 59 is adjusted so that the spacing between rollers 60 coincides with the spacing between U-shaped channels 53 on undercarriage 52 such that carriers 50 are rollably supported on rollers 60. In addition, the height of the various support frames 56 for the upper and lower conveyor sections 10 and 12 is adjusted so that rollers 60 slope downwardly from one end of each conveyor section to the other. Carriers 50 thus merely roll down conveyor sections 10 and 12 under the influence of gravity, with shells 36 supported thereon in side-by-side relationship on either side of undercarriage 52, as shown in FIG. 2.

Lubricating Station

Figure 5:
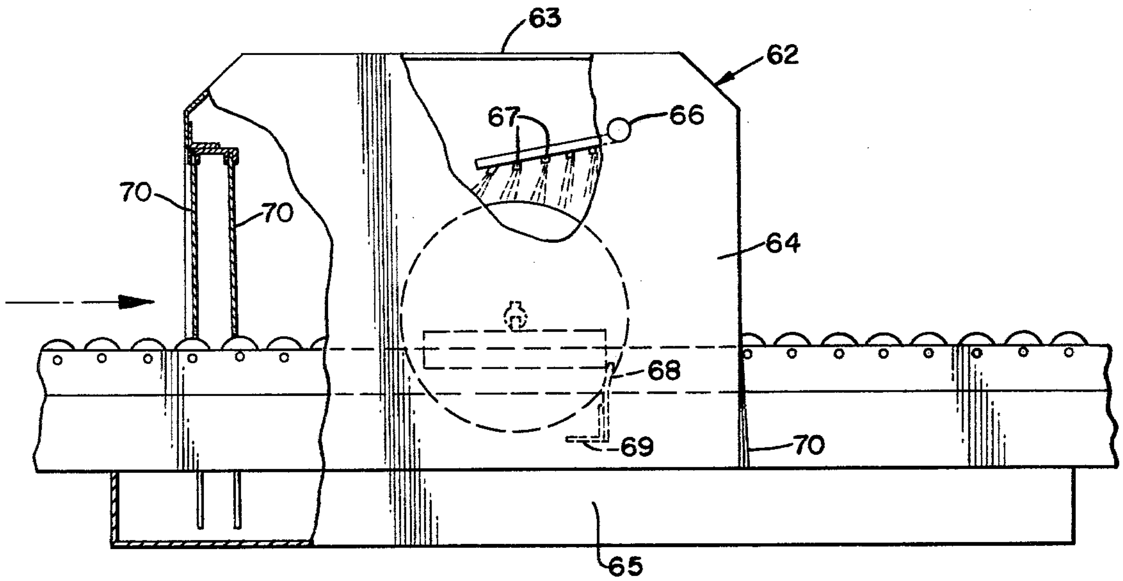
FIG. 5 is a side elevational view, partly in cross-section, of the lubricating station.

Referring now to FIGS. 1 and 5, an operator manually loads a plurality of empty shells 36 onto a carrier 50 and releases the loaded carrier onto upper conveyor section 10 so that the carrier rolls downwardly from left to right, as indicated by the arrows. The first station encountered by loaded carrier 50 is lubricating station 20 which comprises a closed compartment 62 having a top wall 63, two side walls 64, which straddle a portion of conveyor section 10, and a trough 65 integrally connected to the bottom of side walls 64. A manifold 66 provided in the upper portion of compartment 62 extends transversely between side walls 64 and has a plurality of nozzles 67 projecting downwardly therefrom. In addition, a flexible stop 68 affixed to a bracket 69 is provided generally vertically beneath manifold 66 for coacting with undercarriage 52 of each carrier 50 for momentarily stopping the carrier inside compartment 62. In addition, two flexible flaps 70 are positioned both at the entrance and at the exit of compartment 62; entrance flaps 70 being shown in section in FIG. 5.

Manifold 66 is suitably connected to a source of conventional lubricating oil. As each loaded carrier 50 rolls down upper conveyor section 10, and passes through flaps 70 at the entrance of compartment 62, it is arrested by stop 68 in position beneath nozzles 67. Oil is then sprayed from nozzles 67 onto the exterior of shells 36, with the excess oil falling into trough 65 and being drained away through a suitable outlet (not shown). The oil sprayed onto shells 36 facilitates their subsequent cleaning. Spraying of the oil may be activated either manually or by a suitable conventional sensing means in response to the engagement of a loaded carrier 50 with stop 68. After the spraying of the shells has been completed, the front of the succeeding carrier 50 proceeding down conveyor section 10 strikes the rear of the carrier 50 just sprayed, to push the latter past stop 68 for continued travel down section 10. The succeeding carrier 50 is then arrested by stop 68 to be sprayed with oil.

After the loaded carriers 50 have passed through lubricating station 20, they roll downwardly onto platform 16 of adjacent hydraulic elevator 14. When platform 16 is filled with a predetermined number of carriers 50, a conventional stop (not shown) is activated for preventing further carriers from moving onto the platform. Platform 16 is then lowered from adjacent the end of upper conveyor section 10 to adjacent the end of lower conveyor section 12. When platform 16 becomes aligned with the end of lower conveyor section 12, the carriers 50 may be either manually or automatically discharged from platform 16 onto section 12 where they roll under the influence of gravity toward filling station 22, and platform 16 is raised to receive another load of carriers from section 10.

Filling Station

Referring to FIGS. 6–13, filling station 22 comprises a dispensing hopper 24 having a front plate 71 and a spaced rear plate 72 to define therebetween a chamber 73 for holding a supply of a relatively viscous slurry of a cementitious material therein. A semicircular trough 74 is connected to and bridges between front and rear plates 71 and 72. Also, trough 74 has a plurality of transversely aligned, spaced nozzles 75 extending downwardly therefrom. Front and rear plates 71 and 72 have outwarding extending horizontal brackets 76 which are affixed to a plurality of vertical support posts 78 by a plurality of bolts 77 to thereby support hopper 24 above a portion of lower conveyor section 12.

In operation, hopper 24 contains a slurry of a cementitious material which is to be dispensed through nozzles 75 and openings 40 into the interior of shells 36. Typical slurry compositions are disclosed in the aforementioned U.S. Pat. No. 3,463,486 to James. This slurry contains a substantial amount of a relatively dense particulate substance, such as low grade iron ore or mill scale, for imparting mass to the material. Such material is very viscous in nature and difficult to dispense in a uniform and continuous manner. Therefore, a rotary paddle wheel 80 is positioned inside hopper 24 in trough 74 for agitating the slurry to insure that the constituents of the slurry are thoroughly mixed and for assisting the discharge of the slurry through nozzles 75. In addition, a shelf 81 is attached to trough 74 and a vibrator 82 is mounted on the shelf for vibrating hopper 24 to further assist the discharge of the slurry. Vibrator 82 may be any conventional electro-mechanical vibrator.

Figure 8:
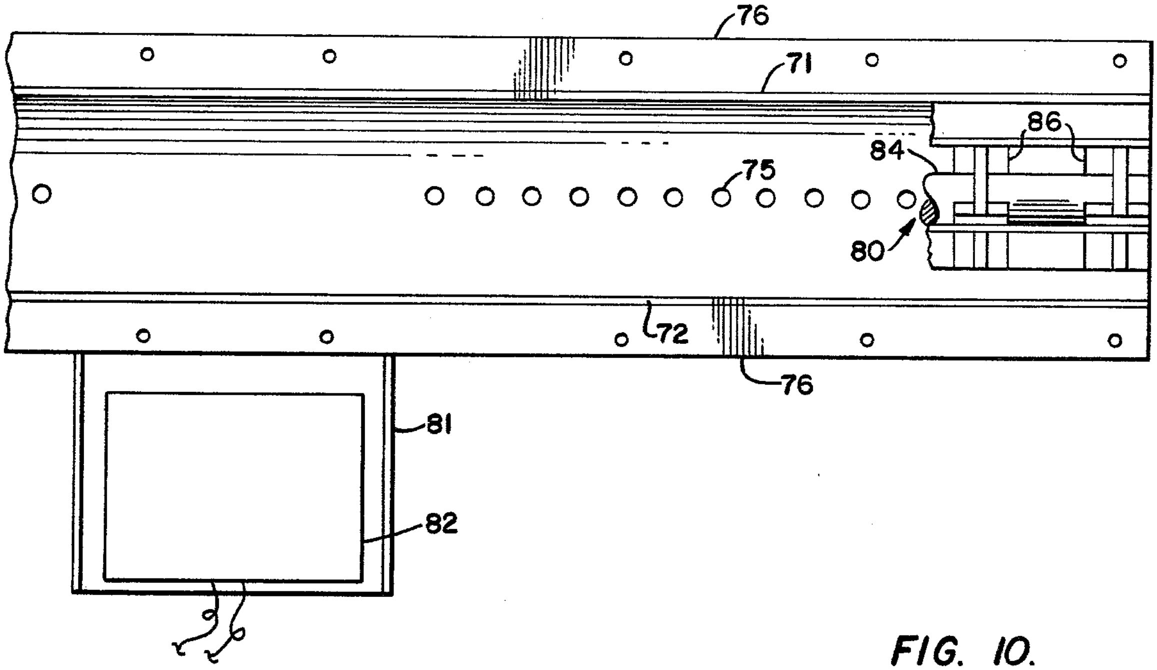
FIG. 8 is a plan view of the dispensing hopper.
Figure 9:
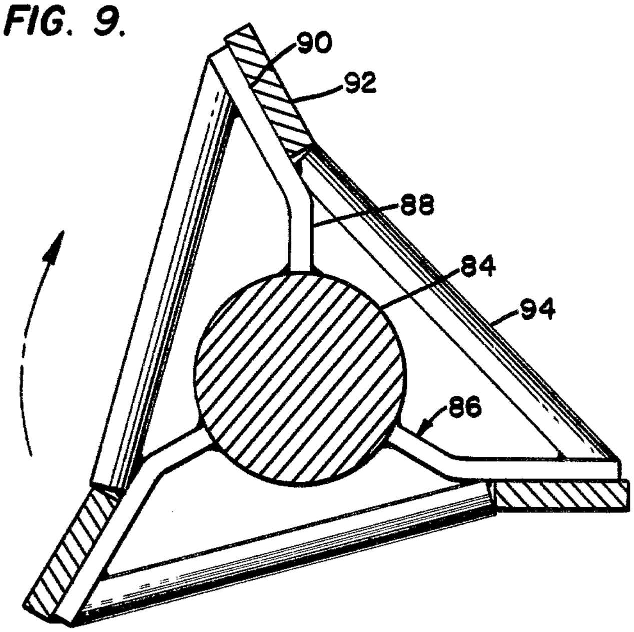
FIG. 9 is a transverse cross-sectional view of the paddle wheel located within the dispensing hopper.
Figure 10:
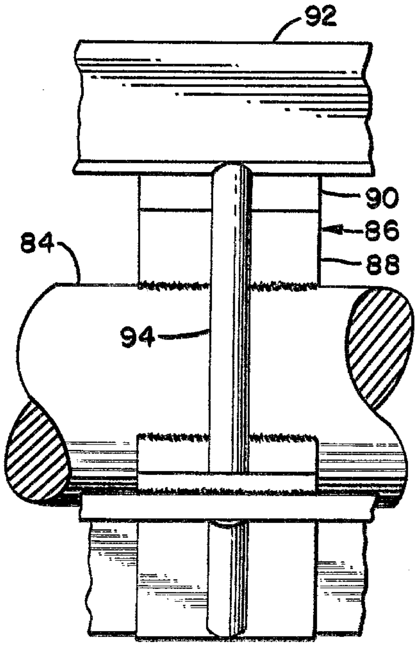
FIG. 10 is a front elevational view of a portion of the paddle wheel of FIG. 9.

Referring to FIGS. 8–10, paddle wheel 80 comprises a shaft 84 which extends transversely through hopper 24 and is rotatably journaled in the side plates of the hopper. Wheel 80 also includes a plurality of sets of circumferentially spaced paddle arms 86. The arms of each set are connected at their inner ends to shaft 84 and extend generally outwardly therefrom. The paddle arm sets are spaced transversely along the length of shaft 84, with the arms of all sets being circumferentially aligned. Each of paddle arms 86 has an inner portion 88 radially arranged relative to the axis of shaft 84 and an outer portion 90 which is angularly oriented relative to a plane containing the axis of shaft 84; specifically, outer portion 90 is angled backwardly from such plane relative to the direction of rotation of shaft 84. A plurality of relatively heavy strips 92 are affixed to the outer portions 90 of all of the circumferentially aligned arms of all of the sets and extend along the entire length of shaft 84 to serve as means for agitating the slurry contained in hopper 24. Also, due to the angular orientation of outer portions 90, paddle wheel 80 more effectively dispenses the slurry through nozzles 75 because strips 92 impart to the slurry a downward component of motion toward nozzles 75. Thus, the slurry will not tend to be swept past the entrances to nozzles 75 as it might be if portions 90 and strips 92 affixed thereto extended radially with respect to shaft 84. A plurality of transversely spaced braces 94 extend between the inner edges of strips 92 and the rear surfaces of the adjacent portions 90. Braces 94 serve to rigidify the paddle wheel structure.

Figure 6:
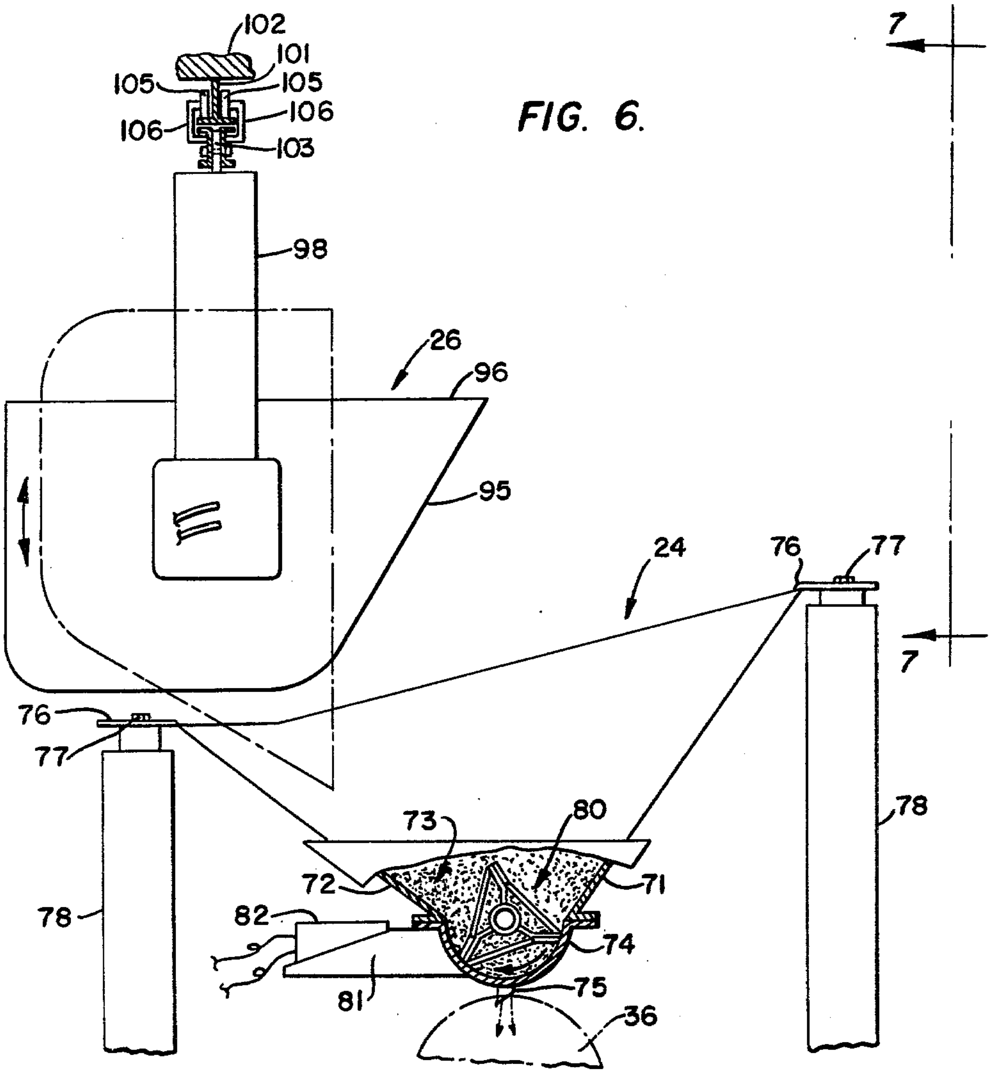
FIG. 6 is a side elevational view, partly in cross-section, of a portion of the filling station showing the dispensing hopper and filling bucket.
Figure 7:
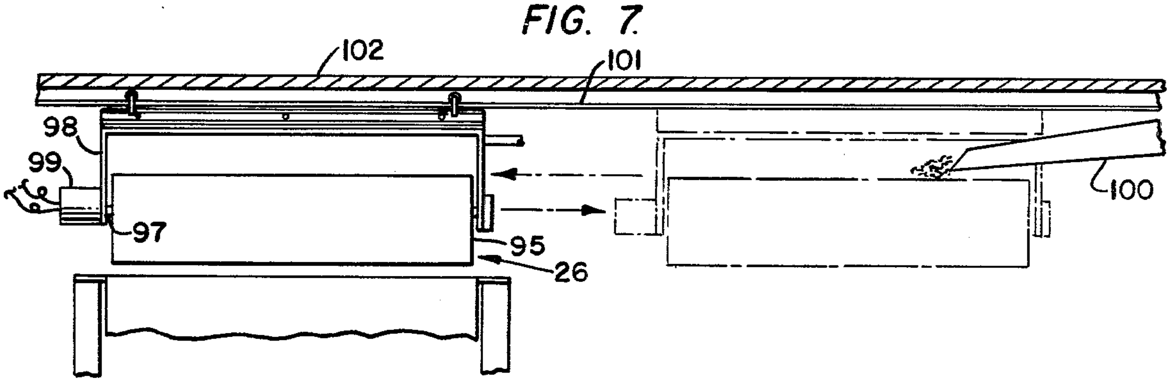
FIG. 7 is a front elevational view of the filling bucket in receiving and discharge positions.

Referring to FIGS. 6 and 7, as paddle wheel 80 and vibrator 82 repeatedly induce the flow of the slurry from hopper 24 downwardly into shells 36, the supply of the slurry in hopper 24 periodically must be replenished. Filling bucket 26 is provided to accomplish this purpose. Filling bucket 26 comprises a generally closed container 95 having an open top end 96. Bucket 26 is rotatably mounted by means of outwardly extending shafts 97 which are journaled in a U-shaped yoke assembly 98. A hydraulic motor 99 is drivingly connected to one of the shafts 97 for effecting rotation of the bucket from a horizontal position in which upper end 96 is horizontally oriented to a tipped position, shown in phantom in FIG. 6, in which bucket 26 discharges the cementitious slurry from end 96 into hopper 24.

Bucket 26 is transversely movable from a position directly above hopper 24 to a position transversely offset therefrom where the bucket can be replenished with the cementitious slurry from a chute 100. Any suitable arrangement for mounting bucket 26 for transverse movement may be utilized. Such an arrangement may comprise a T-shaped flange 101 depending from a fixed support member 102. Yoke 98 has an upwardly extending flange 103 affixed to its upper surface, and a plurality of rotatably mounted rollers 105 are connected to each side of flange 103 by suitable structural linkages 106. Rollers 105 engage T-shaped flange 101 to mount bucket 26 for transverse movement to and from a receiving position beneath chute 100 from and to a discharge position over hopper 24. Such transverse movement may be effected by any suitable drive means, such as a driven endless chain (not shown), for pulling the bucket back and forth between the receiving and discharge positions.

Figure 11:
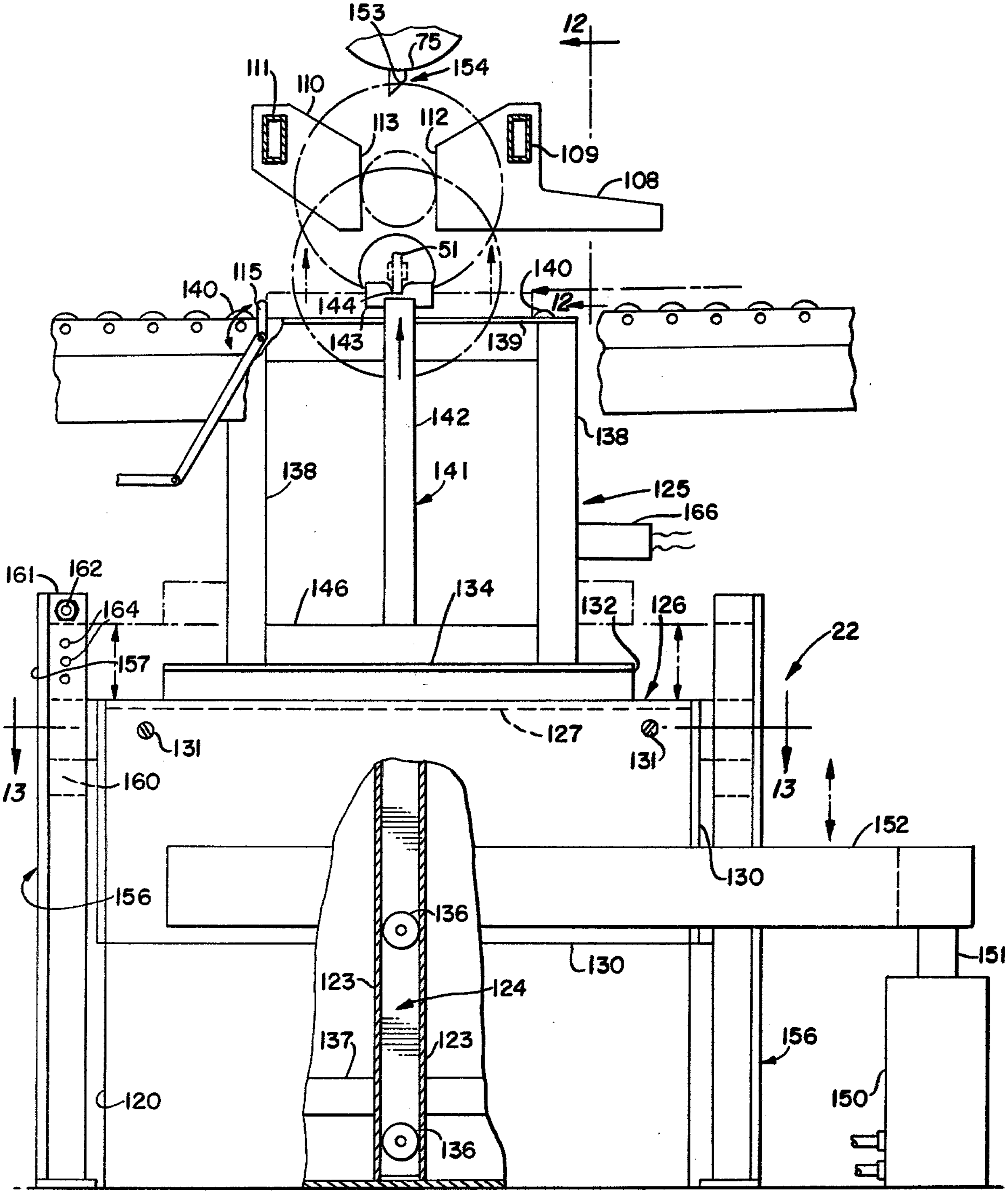
FIG. 11 is a side elevational view, partly in cross-section, of a portion of the filling station showing the carriers and lift table.
Figure 12:
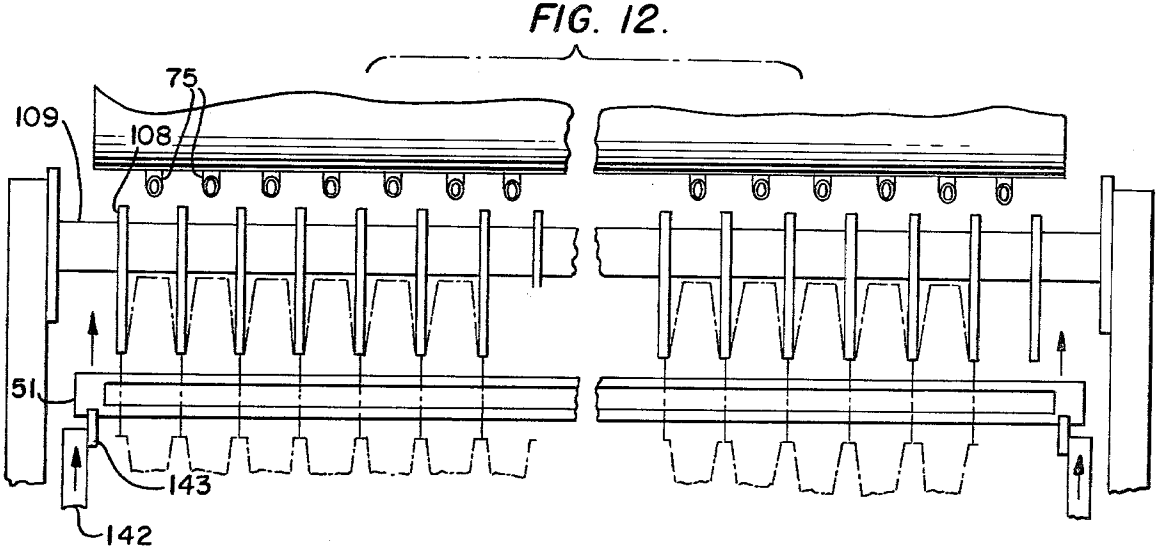
FIG. 12 is a sectional view taken along line 12—12 of FIG. 11.
Figure 13:
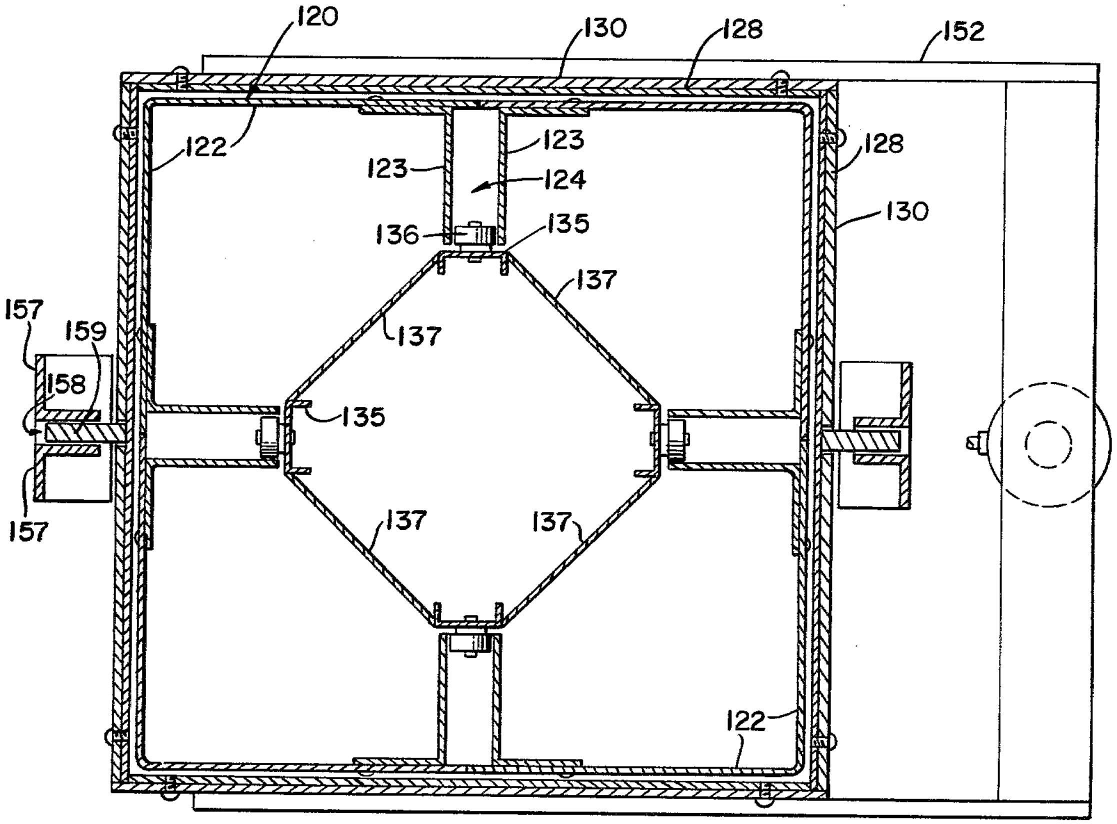
FIG. 13 is a sectional view taken along line 13—13 of FIG. 11.

Referring now to FIGS. 11–13, as each loaded carrier 50 having a plurality of shells 36 thereon approaches filling hopper 24, the shells encounter a plurality of longitudinally extending front guide fingers 108 affixed to a beam 109 that is fixed relative to dispensing hopper 24 by a suitable framework. Similarly, a plurality of longitudinally extending rear guide fingers 110 affixed to a beam 111 are provided in back of front fingers 108 and are longitudinally and transversely aligned therewith. Fingers 108 and 110 slide between and transversely position shells 36 on an incoming carrier 50 so that the filling openings 40 in the shells will be transversely aligned with nozzles 75 on hopper 24. In addition, guide fingers 108 and 110 terminate at the ends proximate each other in generally vertical surfaces 112 and 113, respectively, which are spaced apart a distance generally corresponding to the diameter of locking means 46 on each shell 36. As a loaded carrier 50 approaches hopper 24, a manually or automatically activated stop 115 is raised above the level of conveyor section 12 into interfering relationship with undercarriage 52 of the carrier. Stop 115 is positioned so as to arrest each loaded carrier 50 in a longitudinal position in which openings 40 are generally longitudinally aligned with nozzles 75. However, if any small degree of misalignment should occur, surfaces 112 and 113 of fingers 108 and 110 engage the periphery of raised lands 47 of locking means 46 to more precisely longitudinally align openings 40 with nozzles 75 when carrier 50 is raised off of conveyor section 12 in the manner to be described.

When each loaded carrier 50 has been arrested and positioned beneath dispensing hopper 24, lift table 28 raises the carrier off of conveyor section 12 until each of the nozzles 75 extends downwardly into one of filling openings 40. Lift table 28 comprises a fixed housing 120 having four sides 122 connected together to form a rectangular framework. Each of sides 122 supports an inwardly projecting cam track 124 formed between two opposed, L-shaped flanges 123 affixed to the inner surface of the side.

Lift table 28 also comprises a vertically movable lift section having an upper portion 125 and a lower portion 126. Lower portion 126 comprises a rectangular base plate 127 having a dimension slightly larger than that of the top of housing 120. Base plate 127 has a plurality of sides 128 depending downwardly from the periphery thereof, and a plurality of skirts 130 are attached to each of the sides 128 by screws 131. In addition, a plurality of transversely spaced rubber cushions 132 are affixed between the upper surface of base plate 127 and a mounting plate 134 of upper portion 125. Furthermore, base plate 127 has a plurality of U-shaped channel sections 135 affixed to and extending vertically downwardly from the lower surface thereof, which are generally opposed to cam tracks 124. Each of channel sections 135 has a plurality of rotatable rollers 136 mounted adjacent the surface thereof opposing the associated cam track 124, with rollers 136 extending into the cam track for rolling movement therealong to thereby guide the movement of lower portion 126 with respect to housing 120. A plurality of straps 137 extend between channel sections 135 for reinforcement purposes.

Upper portion 125 of the movable lift section comprises base plate 134 which, as mentioned, is mounted on rubber cushions 132. Four hollow beams 138 positioned respectively at the corners of a rectangle are affixed to and extend upwardly from the upper surface of plate 134. The upper ends of beams 138 are connected together by a top plate 139 having two transversely extending, longitudinally spaced semicircular bars 140 thereon. Bars 140 are spaced apart a longitudinal distance approximately equal to the longitudinal length of undercarriage 52 for purposes of engaging and positioning a loaded carrier 50 when the carrier is moved onto top plate 139. An outrigger 141 also is provided for engaging each of the ends of carrier bar 51 to further support carrier 50 when it is raised off of conveyor section 12. Each outrigger 141 comprises a bar 142 affixed to the adjacent edge of top plate 139, extending downwardly therefrom and affixed to a lower support beam 146 mounted on plate 134. A support bracket 143 is secured to the top of each bar 142 and has a slot 144 therein configured to receive the lower portion of bar 51 as shown in FIGS. 11 and 12. Thus, as upper portion 125 is moved upwardly, undercarriage 52 of a loaded carrier 50 will be positioned between bars 140 and supported by top plate 139, while the outer ends of the associated carrier bar 51 are supported by outriggers 141.

The lift section is raised and lowered by a hydraulic cylinder 150 and an associated piston 151 connected to two opposed skirts 130 of lower lift portion 126 by a clevis arrangement 152. When fluid is supplied to cylinder 150 from a conventional supply reservoir (not shown) to cause piston 151 to extend upwardly, the piston will raise the movable lift section via clevis arrangement 152. Fluid may be supplied to cylinder 150 either manually by an operator at the filling station whenever a loaded carrier 50 is in position beneath hopper 24, or automatically by conventional sensing means in response to the engagement of a loaded carrier with stop 115.

It is desirable that the upward stroke of piston 151 be adjustable so that nozzles 75 do not extend completely into filling openings 40. As shown in FIG. 11, the tip 153 of each nozzle 75 is inclined so that a space 154 remains between the nozzle opening and the associated filling opening 40 when shells 36 have been moved upwardly by lift table 22 to the filling position. Space 154 allows any air trapped inside of a shell 36 to escape while the shell is being filled with the cementitious slurry from hopper 24. Preferably, shells 36 are filled to slightly overflowing to ensure that the shells are completely filled. A relatively simple mechanism for adjusting of the stroke of piston 151 as necessary to ensure that space 154 is present comprises two end posts 156 spaced outwardly from both front and rear skirts 130 of lower lift portion 126 and to which clevis arrangement 152 is not attached. End posts 156 comprise two spaced L-shaped members 157 defining a space 158 therebetween. Cam bars 159 are affixed to and extend outwardly from front and rear skirts 130 into spaces 158. The cam bars are slidable within spaces 158 between permanently fixed lower stops 160 and adjustably fixed upper stops 161.

Each upper stop 161 includes a bolt 162 which extends through the adjacent flanges of members 157 at their upper ends for releasably locking stop 161 in position in space 158. A plurality of vertically spaced holes 164 are provided in such flanges so that stops 161 may be moved upwardly and downwardly between any one of several vertical positions, to thereby adjust the level at which the upward stroke of lower portion 126 will be arrested.

In addition, a conventional electro-mechanical vibrator 166, similar to vibrator 82, is affixed to upper portion 125 of table 122. After the lift section of table 22 has been activated to raise a loaded carrier 50 off of conveyor section 12 and nozzles 75 have engaged filling openings 40, vibrator 166 is activated simultaneously with the activation of vibrator 82 and paddle wheel 80 to ensure that the cementitious slurry completely fills the spaces inside shells 36. Due to the very viscous nature of the slurry, it will not flow out of nozzles 75 under the influence of gravity alone (thereby eliminating the need for valves in nozzles 75), but will flow into shells 36 in a uniform continuous manner only when subjected to the simultaneous agitation and vibration provided by paddle wheel 80 and vibrator 82. Similarly, the vibration provided by vibrator 166 is required to ensure that shells 36 are filled completely. Rubber cushions 132 minimize the vibration imposed on lower portion 126 and housing 120 of table 22 by vibrator 166. After shells 36 have been filled, the lift section of table 22 returns carrier 50 to conveyor section 12. Stop 115 is then released and carrier 50, now carrying fully filled shells 36, moves down conveyor section 12 to capping and cleaning station 30.

Capping and Cleaning Station

Referring to FIG. 1, the capping and cleaning station is only diagrammatically illustrated at 30. For example, at station 30, one or more workmen are provided with caps and mallets by which they manually insert a cap into each filling opening 40 and then hammer the cap downwardly to close the opening. In addition, station 30 includes any suitable means by which shells 36 can be washed with water to remove any of the cementitious slurry which has spilled onto the exterior of the shells during the filling process. One preferred method for such a washing operation merely comprises one or more workmen stationed adjacent conveyor section 12 having hoses or similar spraying devices for manually spraying the the shells with water. Because shells 36 previously have been coated with oil at lubricating station 20, any slurry on the exterior of the shells is easily removed by this simple washing operation.

Curing Station

Figure 14:
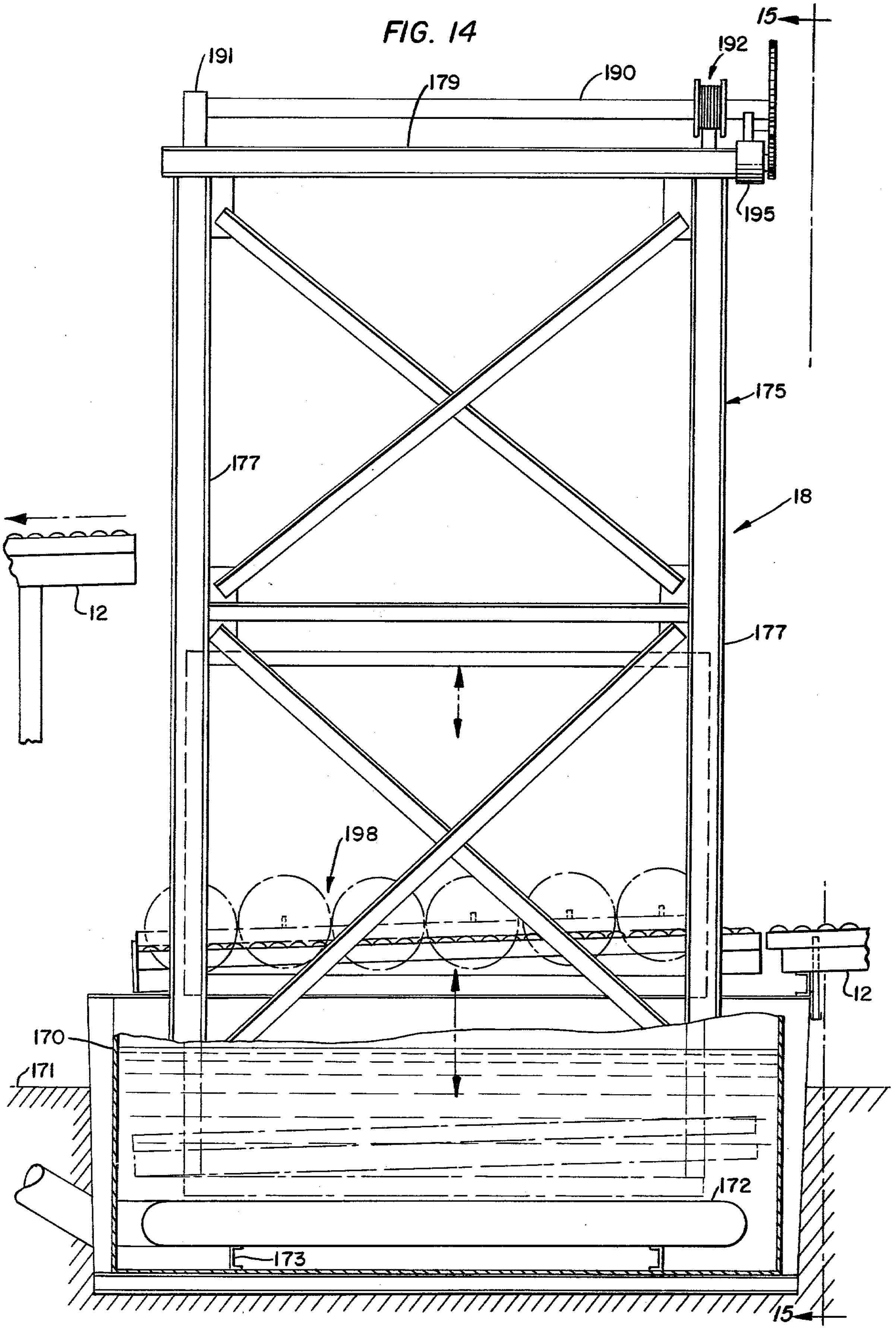
FIG. 14 is a side elevational view of the dip tank.
Figure 15:
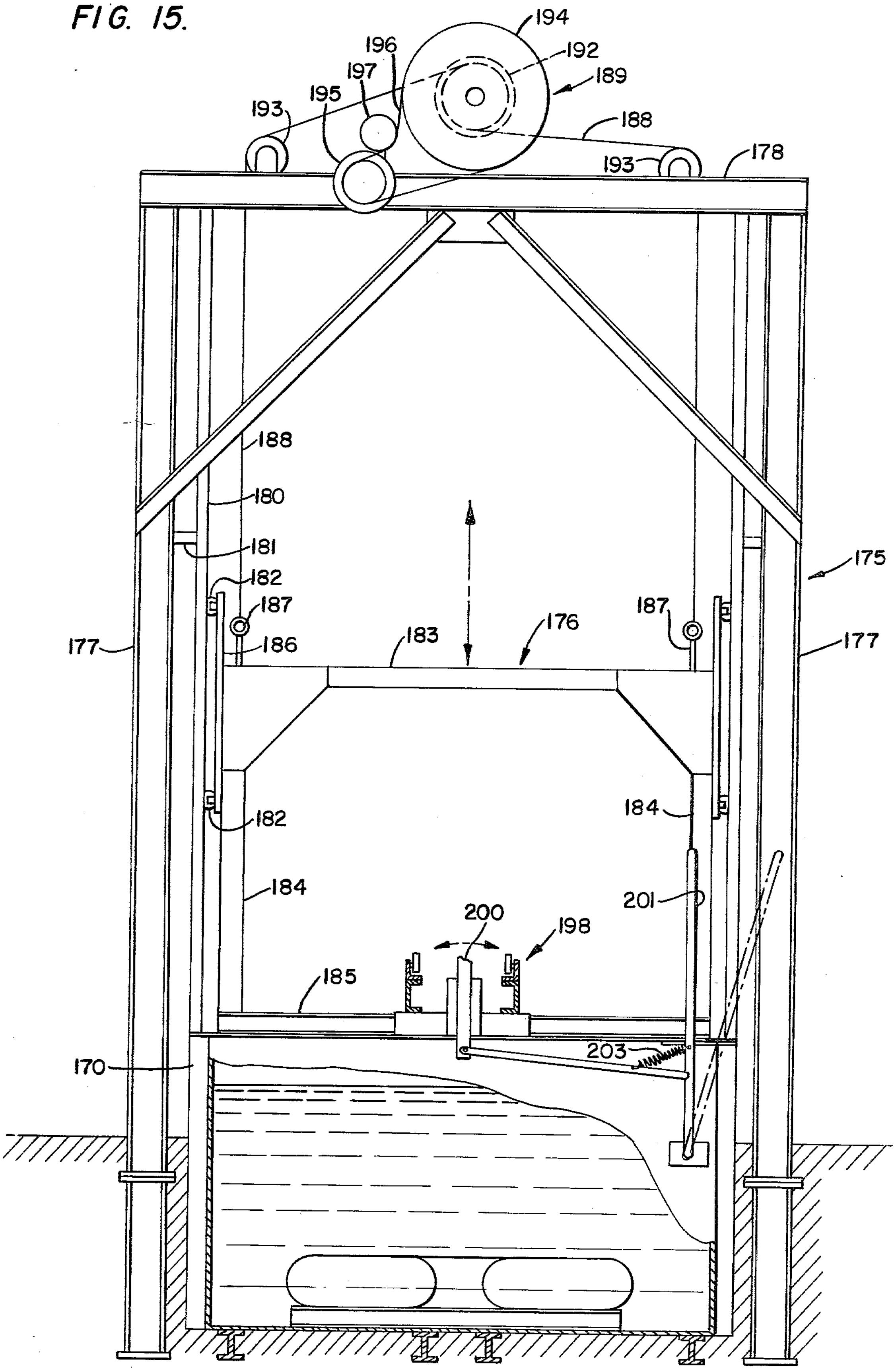
FIG. 15 is a front elevational view taken along line 15—15 of FIG. 14.

After the shells have been capped and cleaned, they then proceed to the curing station which comprises dip tank 18 and that subsection of lower conveyor section 12 extending between tank 18 and discharge station 32. Referring to FIGS. 14 and 15, dip tank 18 includes a rectangular tank 170 recessed into the floor 171 of the building in which filling system 2 is installed. Tank 170 is filled with water to a predetermined level. A plurality of heating coils 172 are located in the lower portion of the tank and are supported upon and spaced above the bottom of the tank by means of a plurality of U-shaped beams 173. Heating coils 172 are adapted to heat the water contained in tank 170 to a temperature in the range of approximately 180°-200° F. Heating coils 172 preferably comprise coils which contain air that has been heated by means of conventional propane burners (not shown). However, any other suitable type of heating medium, such as a heated liquid, may be carried inside coils 172.

A fixed framework 175 is provided around tank 170 and extends vertically upwardly therefrom for supporting an elevator frame 176 for vertical movement. Framework 175 comprises four upwardly extending beams 177 anchored in floor 171 and connected together at their upper ends by transverse beams 178 and longitudinal beams 179. A bar 180 is positioned adjacent each of beams 177 and extends generally parallel thereto, separated therefrom by spacers 181. Bars 180 are fixedly connected between the frame of tank 170 and top beams 178, and serve as guides for a plurality of rollers 182 mounted on elevator frame 176.

Elevator frame 176 comprises two rectangular end frames each comprising a top member 183, two side members 184 and a bottom member 185; members 183, 184 and 185 being connected together to form a rigid structural unit. Rollers 182 are mounted on brackets 186 connected to side members 184 and serve to guide elevator frame 176 as it moves upwardly and downwardly. A plurality of eyebolts 187 are connected to top member 183 of each elevator end frame to couple elevator frame 176 to cables 188 of a lifting means indicated generally at 189. Only one lifting means 189 is illustrated in the drawings, however, an identical lifting means also is operatively connected to the other elevator end frame.

Lifting means 189 comprises a rotatably mounted shaft 190 journalled for rotation in bearing brackets 191 mounted on the top of frame 175. Shaft 190 has a cable drum 192 fixed thereon about which a portion of each cable 188 is wound and from which the cables extend around pulleys 193 and downwardly to eyebolts 187. A driving pulley 194 is fixed intergrally to the end of shaft 190 and may be rotated by a reversible motor 195 via a suitable drive belt 196. Tension on belt 196 may be adjusted by an idler pulley 197. When motor 195 is driven in one direction, drum 192 is rotated such that cables 188 are wound onto the drum and elevator frame 176 is lifted. Conversely, elevator frame 176 will be lowered when motor 195 is driven in the opposite direction.

Elevator frame 176 carries a roller conveyor section 198 mounted on bottom members 185 of the elevator end frames, which section generally is identical to conveyor section 12, including the slope of sections 12 and 198. A pivotally mounted stop 200 is positioned adjacent the end of the subsection of conveyor section 12 leading from capping and cleaning station 30. Stop 200 normally is held in a raised position by a pivot linkage 201 and a tension spring 203. When stop 200 is in the raised position, it arrests the movement of loaded carriers 50 and prevents the carriers from rolling from conveyor section 12 onto conveyor section 198. When elevator frame 176 is in position for conveyor section 198 to receive a plurality of carriers 50, an operator manually operates linkage 201 against the bias of spring 203 to lower stop 200 and allow a predetermined number of carriers 50 to roll onto conveyor section 198 where they are retained by another conventional stop (not shown) at the other end of section 198. After such predetermined number of carriers 50 have rolled onto conveyor section 198, the operator releases linkage 201 allowing stop 200 to raise and prevent any further carriers from moving onto section 198. The operator then manually activates motor 195 to cause frame 176 to move downwardly until the carriers 50 and barbell shells 36 carried thereon are submerged beneath the level of the water in tank 170. Carriers 50 are left in tank 170 for approximately two minutes during which time the heated water in the tank accelerates the curing of the cementitious material inside shells 36. After the shells have remained submerged in tank 170 for such predetermined time period, motor 195 is activated automatically to rotate in the reverse direction, causing elevator frame 176 to be raised to a position where conveyor section 198 is aligned with the subsection of conveyor section 12 extending to discharge station 32. Then, the other conventional stop (not shown) at the other end of conveyor section 198 is operated automatically to allow carriers 50 to roll downwardly onto such subsection.

Referring to FIG. 1, the length of the subsection of conveyor section 12 which extends between dip tank 18 and discharge station 32 is adjusted such that the cementitious material within shells 36 will be substantially completely cured by the time carriers 50 reach discharge station 32. Although this length of conveyor section has been shown in FIG. 1 as being substantially straight, it may include a plurality of switchback portions or zig-zags to provide sufficient time for the material to cure substantially completely by the time carriers 50 reach discharge station 32.

Discharge Station

Figure 16:
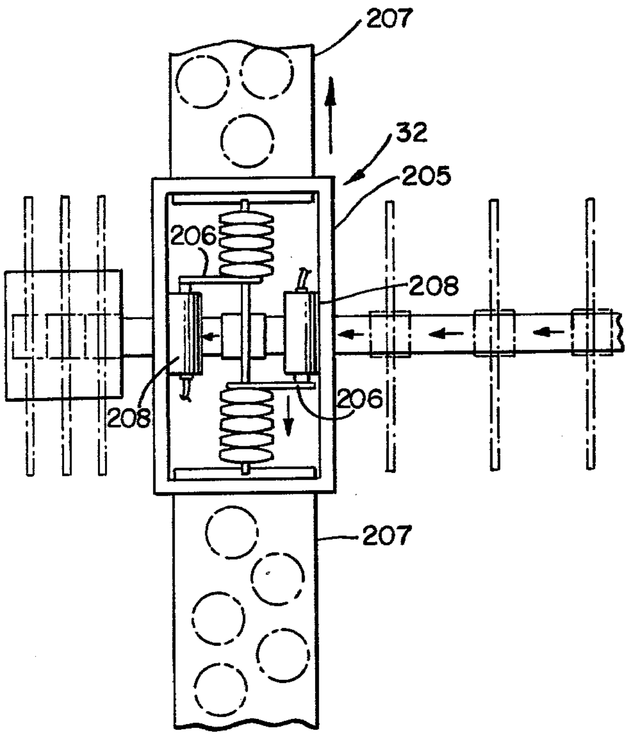
FIG. 16 is a plan view of the discharge station.
Figure 17:
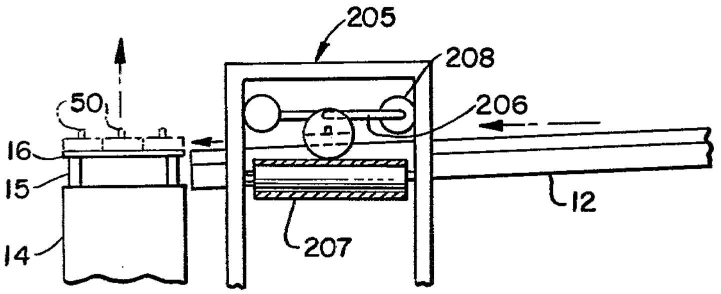
FIG. 17 is a side elevational view of the discharge station.

Referring to FIGS. 16 and 17, discharge station 32 comprises a rectangular frame 205 mounted above conveyor section 12. Frame 205 supports two opposed pushing members 206 adapted to push filled shells 36 off of the ends of carrier bars 51 onto a transversely moving discharge conveyor 207. Members 206 are operated by hydraulic actuators 208 which preferably are activated automatically as each carrier 50 is suitably positioned beneath frame 205. As each carrier 50 proceeds down conveyor section 12 from dip tank 18, preferably the carrier is arrested by a conventional stop (not shown) in an appropriate position for members 206 to engage the inner surfaces of the shells 36 adjacent undercarriage 52. Discharge conveyor 207 may be of any suitable type such as a belt conveyor.

After the discharge operation, the stop is released automatically and the now empty carrier 50 rolls downwardly onto platform 16 of adjacent hydraulic elevator 14. After a number of carriers 50 are collected on platform 16, elevator 14 is activated to raise the empty carriers 50 back up to upper conveyor section 10 where the filling process is repeated in a continuous manner.

The driving elements of the above-described stations, for example, elevators 14, lift table 22, drive motor 195 and actuators 208 are all preferably hydraulically operated. Generally, all of these hydraulically operated elements are connected to a conventional hydraulic reservoir, and are operated by conventional automatic sensing devices or manual operators so that the operation of filling system 2 is semiautomatic. However, it is possible to connect all of such elements to an overall control means, such as a computer, to permit completely automatic operation of the system, if so desired.

Although the present invention has been illustrated in terms of a preferred embodiment, it will be obvious to one of ordinary skill in the art that numerous modifications may be made without departing from the true spirit of the invention which is to be limited only by the scope of the appended claims.

We claim:

1. A method for filling a plurality of containers with a relatively viscous material, each of said containers having a filling opening in the periphery thereof, comprising:

(a) providing a plurality of containers to be filled;

(b) filling said containers with said viscous material, said filling comprising inserting a nozzle into each of said openings, said nozzle being in fluid flow communication with a dispensing hopper holding a supply of said viscous material, simultaneously, repetitiously agitating and vibrating said viscous material inside said hopper by independent means to induce a uniform and continuous flow of said viscous material from said hopper through said nozzle and into one of said containers, and vibrating said containers simultaneously with said simultaneous agitation and vibration of said viscous material to ensure that said containers are completely filled with said viscous material; and (c) further comprising the step of transporting said containers on a plurality of carriers supported on a conveying means through said filling step wherein said inserting of said filling step comprises raising each of said carriers off of said conveying means until each of said openings engages one of said nozzles.

2. A method according to claim 7, further comprising the step of lubricating the exterior of said containers prior to the filling thereof to facilitate subsequent cleaning thereof.

3. An apparatus for filling a plurality of containers with a relatively viscous material, each of said containers having a filling opening in the periphery thereof, comprising; conveying means for transporting said containers to and from a filling station, said conveying means including a plurality of carriers each of which supports a plurality of said containers transversely thereof in side-by-side relationship with said openings oriented generally upwardly; and said filling station comprising a dispensing hopper positioned above said conveying means for holding a supply of said viscous material therein and having a plurality of transversely spaced nozzles projecting downwardly therefrom, means for transversely aligning said openings with said nozzles as each of said carriers approaches said hopper, means for sequentially arresting and positioning said carriers in a longitudinal position beneath said hopper in which said openings are substantially longitudinally aligned with said nozzles, means for lifting each of said carriers upwardly off of said conveying means to a filling position in which each of said nozzles is inserted into one of said openings, means for agitating said viscous material inside said hopper and independent means for simultaneously vibrating said viscous material inside said hopper to induce a continuous and uniform flow thereof from said hopper through said nozzles and into said containers, and means for vibrating said containers on said carriers simultaneously with said simultaneous agitation and vibration of said viscous material to ensure that said containers are completely filled with said viscous material.

4. An apparatus according to claim 3, wherein said agitating means comprises a rotary paddle wheel disposed inside said hopper.

5. An apparatus according to claim 4, wherein said paddle wheel comprises a rotatable shaft, and a plurality of transversely spaced sets of circumferentially spaced paddle arms connected to said shaft and extending generally outwardly therefrom, each of said paddle arms having an outer end portion angularly oriented with respect to a plane containing the axis of said shaft.

6. An apparatus according to claim 5, wherein each of said outer end portions is oriented angularly rearwardly of said plane relative to the direction of rotation of said paddle wheel.

7. An apparatus according to claim 5, wherein said paddle arms of each of said sets are circumferentially aligned with said paddle arms of all of the other of said sets and a plurality of transversely extending strips are connected to said outer end portions of all of said circumferentially aligned paddle arms.

8. An apparatus according to claim 3, wherein each of said carriers comprises an undercarriage for transporting each of said carriers longitudinally of said conveying means, and an elongated transverse support member connected to said undercarriage for supporting said containers thereon; and wherein said lifting means comprises a vertically movable lift table for sequentially moving said carriers to said filling position.

9. An apparatus according to claim 8, wherein said lift table further comprises outriggers for engaging the ends of each of said support members to further support each of said carriers during the lifting thereof.

10. An apparatus according to claim 8, wherein said lift table comprises a fixed housing, a lift section vertically reciprocable relative to said housing and having transversely disposed means for sequentially arresting and positioning said undercarriages, and an actuator connected to said lift section for raising and lowering said lift section.

11. An apparatus according to claim 8, wherein said lift table comprises a fixed housing, a lift section vertically reciprocable relative to said housing, said lift section having an upper portion and a lower portion, said upper portion having transversely disposed means for sequentially arresting and positioning said undercarriages, and an actuator connected to said lower portion for raising and lowering said lift section.

12. An apparatus according to claim 8, wherein each of said nozzles has a slanted tip portion; and wherein said lift table has an adjustable upward stroke such that said nozzles do not completely fill said openings when said carriers are in said filling position to thereby allow air to escape past said slanted tip portions while said containers are being filled.

13. An apparatus according to claim 12, wherein said lift table comprises a housing fixed relative to said conveying means, a lift section vertically reciprocable relative to said housing, said lift section having at least one outwardly projecting flange cooperable with at least one vertically adjustable stop for adjusting the upward stroke of said lift section, and an actuator connected to said lift section for raising and lowering said lift section.

14. An apparatus according to claim 3, wherein said transverse aligning means comprises a plurality of transversely spaced, longitudinally extending guide fingers insertable between said containers on said carriers.

15. An apparatus according to claim 14, wherein each of said containers further has a plurality of raised areas on each side thereof circumscribing a predetermined diameter; and wherein said guide fingers comprise transversely and longitudinally aligned, longitudinally spaced front and rear fingers, said front and rear fingers being spaced apart a longitudinal distance substantially equal to said predetermined diameter to cooperate with said raised areas for correcting any longitudinal misalignment of said openings with said nozzles.

* * * * *